US005258458A

United States Patent [19]
Allewaert et al.

[11] Patent Number: 5,258,458
[45] Date of Patent: Nov. 2, 1993

[54] COMPOSITION FOR PROVIDING OIL AND WATER REPELLENCY

[75] Inventors: Kathy Allewaert, Haverlee; Inge Bohez, Waregem; Pierre V. Elst, Zemst, all of Belgium

[73] Assignee: Minnesota Mining and Manufacturing Company, St. Paul, Minn.

[21] Appl. No.: 662,780

[22] Filed: Feb. 28, 1991

[51] Int. Cl.$^5$ .............................................. C08L 83/04
[52] U.S. Cl. .................... 525/104; 525/124; 525/129; 526/245
[58] Field of Search ................ 525/129, 124, 104; 526/245

[56] References Cited

U.S. PATENT DOCUMENTS

| | | |
|---|---|---|
| 3,329,661 | 7/1967 | Smith et al. |
| 3,398,182 | 8/1968 | Guenthner et al. |
| 3,462,296 | 8/1969 | Raynolds et al. |
| 3,592,686 | 7/1971 | Barber et al. ............... 525/124 |
| 3,849,521 | 11/1974 | Kirimoto et al. |
| 3,896,251 | 7/1975 | Landucci |
| 3,916,052 | 10/1975 | Sherman et al. |
| 3,968,066 | 7/1976 | Mueller ............... 528/67 |
| 4,013,627 | 3/1977 | Temple |
| 4,024,178 | 5/1977 | Landucci |
| 4,043,964 | 8/1977 | Sherman et al. |
| 4,070,152 | 1/1978 | Pentz ............... 8/115.6 |
| 4,215,205 | 7/1980 | Landucci |
| 4,264,484 | 4/1981 | Patel |
| 4,540,765 | 9/1985 | Koemm et al. ............... 528/45 |
| 4,590,236 | 5/1986 | Konig et al. |
| 4,728,571 | 3/1988 | Clemens |
| 4,728,707 | 3/1988 | Amimoto et al. |
| 4,778,915 | 10/1988 | Lina et al. |
| 4,781,844 | 11/1988 | Kortmann et al. |
| 4,834,764 | 5/1989 | Deiner et al. |
| 4,962,156 | 10/1990 | Shinjo et al. |
| 5,019,428 | 5/1991 | Ludemann et al. ............... 427/387 |
| 5,057,589 | 10/1991 | Mosch ............... 528/24 |
| 5,068,295 | 11/1991 | Misaizu et al. ............... 526/245 |

FOREIGN PATENT DOCUMENTS

| | | |
|---|---|---|
| 0121078 | 10/1984 | European Pat. Off. |
| 3609459 | 10/1986 | Fed. Rep. of Germany |
| 3729457A1 | 3/1989 | Fed. Rep. of Germany |
| 60458 | 1/1987 | Japan |
| 64-36674 | 2/1989 | Japan |
| 64-36677 | 2/1989 | Japan |

OTHER PUBLICATIONS

Kirk-Othmer, *Encyclopedia of Chemical Technology*, "Water Proffing and Oil Repellency," John Wiley and Sons, New York, pp. 443-457 (1984).

Banks, R. E. Ed. "Organofluorine Chemicals and their Industrial Applications," Ellis Horwood, Ltd., West Sussex, England pp. 226-230 (1979).

*Primary Examiner*—Melvyn I. Marquis
*Assistant Examiner*—D. Aylward
*Attorney, Agent, or Firm*—Gary L. Griswold; Walter N. Kirn; Carole Truesdale

[57] ABSTRACT

A composition for treating fibrous substrates such as textiles to provide oil and water repellency is provided. The composition comprises a) a terpolymer comprising randomly distributed i) units containing a fluoroaliphatic group, $R_f$, ii) fluorine-free hydrocarbon units, and iii) units containing silicone and b) a fluorine-containing polymer having isocyanate derived linking groups and blocked isocyanate moieties. Also provided is a method for providing oil and water repellency to a fibrous substrate.

8 Claims, No Drawings

COMPOSITION FOR PROVIDING OIL AND WATER REPELLENCY

This invention relates to a composition for treating fibrous substrates to provide oil- and water-repellency. The invention further relates to a method for treating the substrates and still further relates to the treated substrates.

DESCRIPTION OF THE RELATED ART

Treating fibrous substrates with fluorochemicals containing fluoroaliphatic radicals to impart oil and water repellency is known. Fluorochemicals of this type and their application to fibrous substrates are described in various prior art publications including Banks, R. E.. Ed. *Organofluorine Chemicals and their Industrial Applications*, Ellis Horwood, Ltd., West Sussex, England, pp. 226-230 (1979) and Kirk-Othmer, *Encyclopedia of Chemical Technology*, John Wiley and Sons, New York, pp. 442-451 (1984).

Fluorochemical copolymers of ethylenically unsaturated monomers such as fluorinated acrylates, hydrocarbon acrylate and siloxane-containing acrylates are known.

U.S. Pat. No. 3,329,661 (Smith et al.) discloses copolymers of ethylenically unsaturated fluorocarbon monomer and ethylenically unsaturated epoxy group-containing monomer which are useful as oil- and water-repellent treatments for substrates such as textile fabric. The copolymer may optionally contain recurring units which contain neither fluorocarbon nor epoxy.

U.S. Pat. No. 3,916,053 and U.S. Pat. No. 4,043,964 (Sherman et al.), disclose durably soil-resistant carpet comprising organic fibers having thereon a normally solid coating comprising (a) at least one phase of a water-insoluble addition polymer derived from a polymerizable ethylenically unsaturated monomer free of non-vinylic fluorine, the polymer having at least one major transition temperature higher than about 45° C. and a solubility parameter of at least about 8.5, and (b) at least one phase of a water-insoluble fluorinated component containing a fluoroaliphatic radical of at least 3 carbon atoms, the fluorinated component having at least one major transition temperature higher than about 45° C.; and at least one of said phases being a continuous phase.

U.S. Pat. No. 4,013,627 (Temple) discloses oil-and water-repellent polymers comprised of polymer chain repeat units derived from (1) a monomer of the formula $R_fCH_2CH_2OCOC(R)=CH_2$ wherein $R_f$ is an perfluoroalkyl group of 4-14 carbon atoms and R is H or $CH_3$, (2) a vinyl monomer which is free of non-vinylic fluorine and (3) an ionic monomer of the formula $CH_2=C(R)-Z-Y^+X^-$ wherein R is H or $CH_3$, Z is a connecting group which activates vinyl polymerization, $Y^+$ is an onium ionic group and $X^-$ is a water solubilizing anion.

U.S. Pat. No. 4,590,236 (Konig et al.) discloses a process for the production of emulsions containing graft copolymers of ethylenically unsaturated perfluoroalkyl monomers on acrylate dispersions and to the use thereof as hydrophobicizing and oleophobicizing agents.

U.S. Pat. No. 3,462,296 (Raynolds et al.) discloses an oil- and water-repellent polymer of $R_fCH_2CH_2O_2CC(CH_3)=CH_2$ where $R_f$ is perfluoroalkyl, 2-ethylhexylmethacrylate, $RCH(OH)CH_2O_2CCR'=CH_2$ where R and R' and hydrogen or methyl, an, optionally, N-methylolacrylamide and an oil- and water-repellent mixture of polymers comprising the above polymer and a polymer of a vinylidine monomer or a conjugated diene.

U.S. Pat. No. 4,728,707 (Amimoto et al.) discloses a water- and oil-repellent copolymer which comprises repeating units derived from (a) a monomeric compound having at least a perfluoroalkyl or perfluoroalkenyl group and an acrylate or methacrylate group and (b) a methacrylate, a homopolymer of which has a glass transition temperature of not lower than 115° C., which has good resistance to dry cleaning and resistance to slippage.

The use of fluorinated compounds containing urethane bonds is also known. A common synthetic route for forming such compounds containing urethane bonds uses isocyanate compounds as starting material. The use of blocking agents to 'block' the unreacted isocyanate moieties is also known.

U.S. Pat. No. 3,398,182 (Guenthner et al.) discloses fluorochemical compounds which contain a highly fluorinated oleophobic and hydrophobic terminal portion and a different nonfluorinated oleophobic portion linked together by a urethane radical obtained by reacting together an isocyanate and a highly fluorinated organic compound containing an active hydrogen.

U.S. Pats. No. 3,896,251, No. 4,024,178 and No. 4,215,205 (Landucci) disclose an outerwear fabric treatment which provides durably launderable and dry-cleanable repellency to water and oil on fabrics consisting essentially completely of hydrophobic synthetic fibers by application of a blend of a fluoroaliphatic vinyl polymer and a carbodiimide, preferably comprising fluoroaliphatic groups.

Japanese Patent Application No. 62[1987]-458 (Asahi Kasei Kogyo) disclose a fluorine-containing urethane based on 1,8 diisocyanate-4-isocyanate methyl octane which is prepared by reacting n moles of a fluoro alcohol and 3-n moles of an active H containing moiety such as lower alkyl alcohols, phenols, oximes having functional group or aromatic group such as glycydole, furfuryl alcohol, or benzyl alcohol; and isocyanate blocking agents such as e-caprolactam, methyl acetate, and imidazole. This aliphatic composition is intended to provide a non-yellowing oil- and water-repellent treatment for carpets and carpet fibers.

U.S. Pat. No. 4,540,765 (Koemm et al.) discloses polyurethanes which render surfaces, such as of textile fabrics and fibers, repellency to oil and/or water, and which are prepared by condensing diols containing perfluoroalkyl ligands, optionally together with non-fluorinated di- or polyalcohols or amines or mercaptans in admixture or in blocks with one or more di- or polyisocyanates, in amounts such that the polyurethane chains or networks formed carry at their ends free isocyanate groups which, finally, are blocked with a suitable protective group. Known blocking agents for isocyanates are, for example, oximes, sulphites and phenols. Subsequent heating removes the end blocks and effects chemical fixation on the surface of the fibers or fabric.

U.S. Pat. No. 4,264,484 (Patel) discloses a carpet treatment whereby carpet is rendered soil resistant and stain repellent by contacting it with a carpet treating composition comprising a liquid containing a water-insoluble addition polymer derived from polymerizable ethylenically unsaturated monomer free of nonvinylic fluorine and having at least one major transition temperature higher than about 25° C. and a water-insoluble fluoroaliphatic radical- and aliphatic chlorine-containing ester, which can be a urethane, having at least one major transition temperature higher than about 25° C.

U.S. Pat. No. 4,778,915 (Lina et al.) discloses water- and oil-repellent treatments based on fluoroacrylic monomers which simultaneously contain a urethane linkage and a urea linkage or two urea linkages and terminal perfluoroalkyl and acrylate groups. The fluoroacrylic monomers can be prepared by reacting a diisocyanate with substantially equimolar quantities of a polyfluor compound containing a mobile hydrogen atom in the form of a terminal hydroxyl, thiol or primary or secondary amino group attached to a perfluoro radical directly or indirectly. The monomer can be polymerized through the terminal acrylate group as a homopolymer or a copolymer with other monomers.

The inclusion of silicone moieties in treatments with fluorochemicals which provide oil- and water-repellency is known to impart desirable properties to the feel or 'hand' of the treated substrates.

Japanese Patent Publication No. 64[1989]-36674 (Nippon Mectron) disclose waterproofing and oilproofing compositions comprising a fluorine-containing copolymer of polydimethylsiloxane and polymethylsiloxane wherein 10 to 100% of the hydrogen atoms of the polymethylsiloxane are substituted with a fluoroaliphatic containing moiety. This resulting copolymer is mixed with a fluorine containing acrylate copolymer.

Japanese Patent Publication No. 64[1989]-36677 (Nippon Mectron) discloses waterproofing and oilproofing compositions comprising a fluorine-containing copolymer of polydimethylsiloxane and polymethylepoxysiloxane wherein 10 to 100% of the epoxy groups within the polymethylepoxysiloxane are substituted with a fluorine containing moiety. This resulting copolymer is mixed with a fluorine containing acrylate copolymer.

U.S. Pat. No. 4,962,156 (Shinjo et al.) discloses a water- and oil-repellent composition comprising (A) at least one species selected from the group consisting of a homopolymer and a copolymer of perfluoroalkyl group containing acrylate, a homopolymer and a copolymer of methacrylate, a copolymer of the same and a monomer copolymerizable therewith and a perfluoroalkyl group-containing urethane compound, and (B) a ladder polymer of organosilsesquioxane.

German Patent Publication No. 37 29 457 A1 (Bayer) discloses contact-optical articles which contain a wettable, optionally crosslinked, copolymer prepared from perfluoroalkyl-sulfonamidoalkyl methacrylate, siloxanyl(meth)acrylic esters and optionally non-hydrophilic vinyl monomers, bis- or polyfunctional vinyl monomers and hydrophilic vinyl monomers as the reactive components.

It is also known to add various hydrocarbon compositions to the fluorochemical/silicone-containing compositions for the purpose of extending the performance of the relatively more expensive fluorine treatments.

U.S. Pat. No. 4,834,764 (Deiner et al.) discloses a process for obtaining wash- and cleaning-resistant textile finishes with reactive perfluoroalkyl-containing (co)polymers and/or precondensates and a blocked isocyanate compound. The process comprises the textile impregnation with customary reactive perfluoroalkyl-containing (co)polymers and/or precondensates in aqueous dispersion and concluding heating, the dispersions further containing NCO-containing compounds which have a molecular weight of at least 450 and/or contain a diphenylmethane-based polyisocyanate mixture in blocked form.

U.S. Pat. No. 3,849,521 (Kirimoto et al.) disclose oil- and water-repellent compositions comprising an oil- and water-repellent polymer containing units of a fluoroalkyl monomer and an additive copolymer containing monomer units of the formula:

wherein $R_1$, $R_2$, and $R_3$ represent hydrogen atoms or methyl groups, and $R_4$ represents $C_{1-18}$ alkyl groups; and monomer units of the formula:

wherein $R_5$ represents a hydrogen atom or a methyl group.

SUMMARY OF THE INVENTION

The present invention, in one aspect, provides a composition for treating fibrous substrates such as textiles to provide oil and water repellency the composition comprising a) a terpolymer comprising randomly distributed i) units containing a fluoroaliphatic group, $R_f$, ii) fluorine-free hydrocarbon units, and iii) units containing silicone and b) a fluorine-containing polymer having isocyanate derived linking groups and blocked isocyanate moieties. The composition may optionally contain a hydrocarbon extender to improve fluorine efficiency.

The present invention, in another aspect, provides a method for providing oil and water repellency to a fibrous substrate comprising the steps of (1) contacting the fibrous substrate with an effective amount of a solution or emulsion comprising a) a terpolymer comprising randomly distributed i) units containing a fluoroaliphatic group, $R_f$, ii) fluorine-free hydrocarbon units, and iii) units containing silicone and b) a fluorine-containing polymer having urethane bonds and blocked isocyanate moieties; (2) drying the treated substrate and (3) heating the treated substrate.

The present invention, in a further aspect, provides a fibrous substrate treated with the composition of the present invention.

The composition and method of the present invention provide oil and water repellency wherein the repellency regenerates after laundering and drying, e.g., air drying or machine drying and regenerates after a substantial wetting without detergent such as one might experience in actual use. The treated substrate exhibits good spray rating performance after laundering and drying.

A class of the terpolymer useful in the present invention can be represented by the general formula I

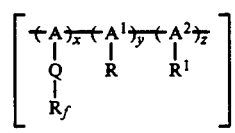

wherein
A, $A^1$, and $A^2$ are randomly distributed and are each independently an alkyl group having two to three carbon atoms;
Q is a divalent organic linking group;

$R_f$ is a fluoroaliphatic group which comprises a fully fluorinated terminal group;

R is a fluorine free organic group;

$R^1$ is a fluorine free organic group which comprises a siloxanyl group such as polydimethylsiloxanyl.

x is a number in the range of about 5 to 100;

y is a number in the range of about 5 to 200; and z is a number in the range of about 1 to 75.

The terpolymer is formed by the polymerization of monomers represented by the formulas $$A'-Q-R_f \qquad \text{II}$$

$$A^{1'}-R \qquad \text{III}$$

$$A^{2'}-R^1 \qquad \text{IV}$$

wherein $A'$, $A^{1'}$, and $A^{2'}$, represent ehtylencially unsaturated alkylene segments having 2 to 3 carbon atoms capable of copolymerization, preferably containing 2 carbon atoms; and $R_f$, Q, R, and $R^1$ are as set forth above.

Preferably, the copolymerizable segment containing the $R_f$ group comprises about 50 to 90 weight percent, more preferably about 60 to 80 weight percent of the terpolymer. Preferably, the copolymerizable hydrocarbon segment free of fluorine comprises about 10 to 50 weight percent, more preferably about 10 to 30, weight percent of the terpolymer. Preferably, the copolymerizable segment containing silicone comprises about 3 to 25 weight percent, more preferably about 5 to 20, weight percent of the terpolymer when the silicone segment has a number average molecular weight in the range of about 1000 to 10,000 and about 0.5 to 10 weight percent, more preferably 0.5 to 5 weight percent, when the silicone segment has a number average molecular weight in the range of about 10,000 to 20,000.

The fluorine-containing polymer having isocyanate derived linking groups and blocked isocyanate sites can be represented by the formula V:

$$(R_f-Q-R^2)_n X+Y)_m \qquad \text{V}$$

wherein $R_f$ and Q are as previously described;

$R^2$ represents a fluorine free aliphatic radical which is the residue of a moiety capable of reacting with an isocyanate;

X represents a polyvalent isocyanate residue i.e., the structure remaining after an isocyanate functionality reacts with a nucleophile such as an alcohol or an amine;

Y represents an organic moiety capable of blocking an isocyanato group; and m+n equals the number of isocyanato functionalities contained in the isocyanate compound which is the precursor of X.

The fluoroaliphatic radical, $R_f$, is a fluorinated, stable, inert, preferably saturated, non-polar, monovalent aliphatic radical which is hydrophobic and oleophobic. It can be straight chain, branched chain, or cyclic or combinations thereof and is preferably free of polymerizable olefinic unsaturation. $R_f$ can contain catenary heteroatoms, bonded only to carbon atoms, such as oxygen, divalent or hexavalent sulfur, or nitrogen. $R_f$ is preferably a fully fluorinated radical, but hydrogen or chlorine atoms can be present as substituents provided that not more than one atom of either is present for every two carbon atoms. $R_f$ preferably contains at least about 3 carbon atoms, more preferably 3 to about 20 carbon atoms, and most preferably about 6 to about 12 carbon atoms. It is preferred that $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., $CF_3CF_2CF_2-$, $(CF_3)_2CF-$, $-CF_2SF_5$, or the like. Perfluorinated aliphatic groups, i.e., those of the formula $C_nF_{2n+1}$, are the most preferred Linking group Q links the fluoroaliphatic group $R_f$ to the aliphatic backbone of the terpolymer. Linking group Q preferably contains from 1 to about 20 carbon atoms. Q can optionally contain oxygen, nitrogen, or sulfur-containing groups or a combination thereof, and Q is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of suitable linking groups Q include straight chain, branched chain, or cyclic alkylene, arylene, aralkylene, oxy, oxo, hydroxy, thio, sulfonyl, sulfoxy, amino, imino, sulfonamido, carboxyamido, carbonyloxy, urethanylene, ureylene, and combinations thereof such as sulfonamidoalkylene. Preferred linking groups Q can be selected according to ease of preparation and commercial availability.

Examples of such linking groups Q include the following wherein each k is independently an integer from 1 to about 20, g is an integer from 0 to about 10, h is an integer from 1 to about 20, $R^3$ is hydrogen, an alkyl group having 1 to about 4 carbon atoms, or phenyl, and $R^4$ is an alkyl group having 1 to about 20 carbon atoms:

$-SO_2NR^3(CH_2)_kO(O)C-$ $-CONR^3(CH_2)_kO(O)C-$ $-(CH_2)_kO(O)C-$ $-CH_2CH(OH)CH_2O(O)C-$ $-CH_2CH(OR^4)CH_2O(O)C-$ $-(CH_2)_kC(O)O-$ $-CH=CH_2(CH_2)_kO(O)C-$ $-(CH_2)_kSC(O)-$ $-(CH_2)_kO(CH_2)_kO(O)C-$ $-(CH_2)_kS(CH_2)_kO(O)C-$ $-(CH_2)_k(OCH_2CH_2)_kO(O)C-$ $\phantom{-SO_2N}\overset{\displaystyle CH_2CH=CH_2}{\underset{\displaystyle |}{\phantom{X}}}$
$-SO_2N(CH_2)_kO(O)C-$ $-(CH_2)_kSO_2(CH_2)_kO(O)C-$ $-SO_2NR(CH_2)_kO(CH_2CH_2)_kO(O)C-$ $-(CH_2)_kSO_2NR(CH_2)_kO(O)C-$ $-(CH_2)_kSO_2-$ $-SO_2NR^3(CH_2)_k-$ -continued

—OC₆H₄CH₂O(O)C—

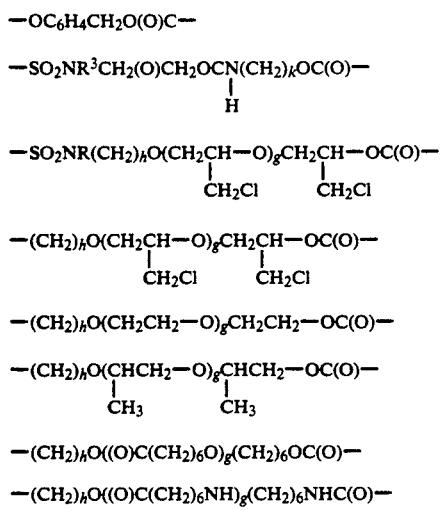

Q is preferably alkylene, sulfonamido, or sulfonamidoalkylene.

A', A¹', and A²' contain an ethylenically unsaturated segment capable of copolymerization with itself or each other. Suitable segments include, for example, moieties derived from vinyl ethers, vinyl ester allyl esters, vinyl ketones, styrene, vinyl amide, acrylamides, maleaten, fumaraten, acrylates, and methacrylates. Of these, the esters of the alpha, beta unsaturated acids, such as the acrylates and methacrylates are preferred.

Compounds of Formula II and methods for the preparation thereof are known and disclosed, e.g., in U.S. Pat. No. 2,803,615 (Ahlbrecht et al.) which disclosure is incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like.

Preferred compounds of Formula II include, for example, N-methyl perfluorooctanesulfonamidoethyl acrylate, N-methyl perfluorooctanesulfonamidoethyl methacrylate, N-ethyl perfluorooctanesulfonamidoethyl acrylate, N-methylperfluorohexylsulfonamidoethyl acrylate, the reaction product of isocyanatoethyl methacrylate and N-methylperfluorooctanesulfonamidoethyl alcohol, perfluoroocty acrylate, N-methyl perfluorooctanesulfonamidoethyl vinyl ether, and N-allyl perfluorooctanesulfonamide, and others such as perfluorocyclohexyl acrylate, and tetrameric hexafluoropropyleneoxide dihydroacrylate.

Compounds suitable for formula III are also well known and generally commercially available. Examples of such compounds include general classes of ethylenic compounds capable of free-radical polymerization, such as, for example, allyl esters such as allyl acetate and allyl heptanoate; alkyl vinyl ethers of alkyl allyl ether such as cetyl vinyl ether, dodecylvinyl ether, 2-chloroethylvinyl ether, ethylvinyl ether; unsaturated acids such as acrylic, methacrylic, alpha-chloro acrylic, crotonic, maleic, fumaric, itaconic, citranonic, and seneciocic acids and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; α,β-unsaturated nitriles such as acrylonitrile, methacrylonitrile, 2-chloroacrylonitrile, 2-cyanoethyl acrylate, alkyl cyanoacrylates; α,β-unsaturated carboxylic acid derivates such as allyl alcohol, allyl glycolate, acrylamide, methacrylamide, n-diisopropyl acrylamide, diacetonacrylamide, N,N-diethylaminoethylmethacrylate, N-t-butylamino ethyl methacrylate; styrene and its derivatives such as vinyltoluene, alpha-methyl styrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene; and vinyl, allyl or vinyl halides such as vinyl, vinylidene chloride, vinyl or vinylidene fluoride.

Examples of such compounds include: octadecylmethacrylate, 2-ethylhexylmethacrylate, 2-ethylhexylacrylate, 1,3-dichloropropane-acrylate, and tertiary-butylcyclohexyl-methacrylate.

$R^1$ is a segment which contains a siloxane backbone with pendant alkyl and/or aryl groups. Examples include:

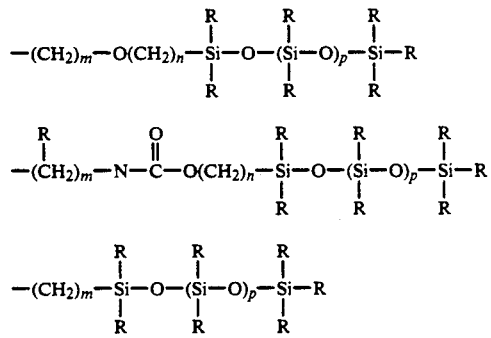

wherein
  each R can be the same or different and can be, for example, alkyl such as methyl, ethyl, isopropyl, propyl, and butyl, or aryl such as phenyl or benzyl, with methyl preferred;
  m is from 1 to 3;
  n is from 1 to 3;
  p is from 0 to 270, preferably 10 to 130.

Particularly preferred are polydimethyl siloxane diacrylates having molecular weights in the range of about 1000 to 20,000, more preferably 1000 to 10,000.

Preparations of these materials are described in U.S. Pat. No. 4,728,571 (Clemens et al) the disclosure of which is incorporated herein by reference. Siloxanyl methacrylates are also described in German Patent Publication No.. 37 29 457 A1.

$R^2$ is formula V is a moiety containing an active hydrogen atom such as a hydroxyl, thiol, or amine group. The hydroxyl functionality is preferred.

Examples of compounds containing an $R_f$ radical which are useful in preparing the urethane group containing component include, for example, the following wherein g, h and k are as previously defined

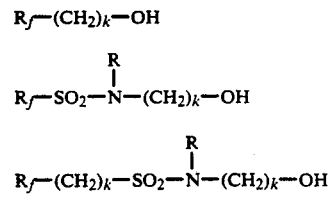

-continued

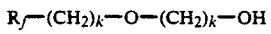

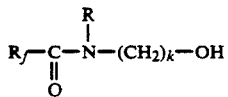

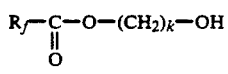

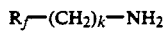

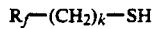

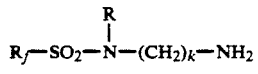

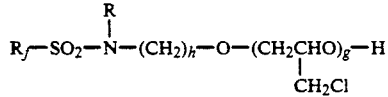

The group represented by X in formula V is an isocyanate-derived linking group that can result from the reaction of a nucleophile such as an alcohol, an amine, or a thiol with an aromatic diisocyanate, polyisocyanate or an isocyanate dimer, trimer, oligomer, or the like. Suitable isocyanate-derived linking groups X include acylimino (—CONH—),

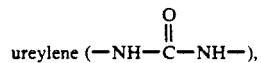

ureylene (—NH—C—NH—),

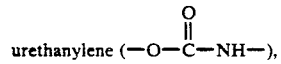

urethanylene (—O—C—NH—),

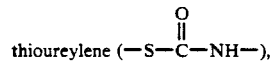

thioureylene (—S—C—NH—),

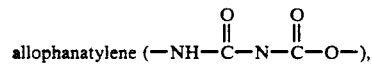

allophanatylene (—NH—C—N—C—O—),

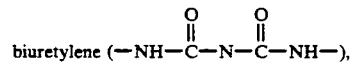

biuretylene (—NH—C—N—C—NH—),

Of these isocyanate-derived linking groups, the urethanylene is preferred.

The X group may be derived, for example, from the following aromatic isocyanate compounds: polymethylenepolyphenylisocyanate (PAPI), 2,4-toluenediisocyanate, Desmodur Rf (a tri-(phenylisocyanate) with an S=P bond) (from Bayer West Germany), Desmodur L (a tri-(amidotoluylisocyanate)), 4,4'-methylenediphenylenediisocyanate, 4,6-di-(trifluoromethyl)-1,3-benzene diisocyanate, 2,6-toluene diisocyanate, o-, m-, and p-xylene diisocyanate, 4,4'-diisocyanatodiphenylether, 3,3'-dichloro-4,4'-diisocyanatodiphenylmethane, 4,5-diphenyldiisocyanate, 4,4'diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanatodiphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate.

A particularly preferred type of functional group that imparts a durable property when the compound is applied to a fibrous substrate is a blocked isocyanato, i.e., the reaction product of an isocyanate and a blocking agent, wherein the blocking agent is removable from the isocyanate under the thermal conditions employed upon curing a substrate treated with a compound containing the blocked isocyanato group. After removal of the blocking agent the compound can chemically fix to the substrate being treated.

Conventional isocyanate blocking agents include arylalcohols such as phenol, cresols, nitrophenols, o- and p-chlorophenol, naphthols, and 4-hydroxybiphenyl; alkanone oximes having 2 to 8 carbon atoms such as acetone oxime and butanone oxime; arylthiols such as thiophenol; organic active hydrogen compounds such as malonate, acetylacetone, ethyl acetoacetate, ethyl cyanoacetate, e-caprolactam; sodium bisulfite; and hydroxylamine. Particularly preferred blocked isocyanates include those blocked with $C_2$ to $C_8$ alkanone oximes, particularly butanone oxime, as such blocked isocyanates can be de-blocked at a relatively low temperature without the aid of a catalyst.

Preferably, terpolymer (a) is present in an amount of about 20 to 80 weight percent, more preferably about 40 to 60 weight percent, of the composition and the urethane-containing polymer is present in an amount of about 20 to 80 weight percent, more preferably about 40 to 60 weight percent of the composition.

A hydrocarbon extender can optionally be used with the composition of the invention. An extender is generally a more economical, non-fluorine containing component which may be admixed with the fluorinated components. One requirement of any extender additive is that it must not adversely affect the oil- and water-repellent characteristics provided by the fluorine-containing composition. Additionally, it is desirable that certain other characteristics such as soft hand, durability, and stain resistance, not be adversely affected by the extender additions. Generally, the extender can comprise up to about 20 weight percent of the treating composition. Suitable extenders are described in U.S. Pat No. 3,849,521 (Kirimoto et al.) which is incorporated herein by reference.

Suitable materials include 2-ethylhexylmethacrylate/N-methylolacrylamide, or a copolymer of 2-ethylhexylmethacrylate with other crosslinker monomers such as CL-960 (available from SNPE), N-Isobutylmethacrylate, (available from Cyanamid ), and N-n-butylmethacrylate (available from Cyanamid).

The water- and oil-repellent composition of the invention is preferably applied to a fibrous substrate by coating, dipping, spraying, padding or roller coating or by a combination of two or more of these methods. For example, an emulsion as described above may be used as a pad bath. The substrate is padded in such a bath and excess liquid removed by squeeze rollers so that the dried substrate would carry from about 0.01 to 1% by weight of the terpolymer/urethane mixture of the invention. The treated substrate is dried at a temperature of about 70° C. and cured for at least about 3 minutes at a temperature of at least 110° C., preferably at least 130° C., most preferably at least 150° C.

The following descriptions show the preparation of components useful in the present invention. All reactions were carried out under a nitrogen atmosphere unless otherwise indicated. All parts and percentages are by weight unless otherwise indicated.

Urethane A

Into a dry 500 mL three-necked flask fitted with a stirrer, an addition funnel, a condenser, a thermometer, and nitrogen inlet and outlet, was placed 40.8 g (0.3 moles) polyphenylene polyisocyanate (PAPI, Upjohn), 55.8 g (0.1 moles) N-methyl perfluorooctanesulfonamidoethyl alcohol, and 265 g ethyl acetate (EtOAc). The reaction mixture was heated to 65° C. and 0.06 g dibutyltindilaureate, (DBTDL) available from Aldrich Chemical Co., was added. Then 17.4 g (0.2 moles) 2-butanone oxime was added by means of the addition funnel over a period of 15 minutes. The reaction was stirred 15 hours at reflux (about 70° C.). The reaction was substantially complete as indicated by infrared spectroscopy which showed substantially no unreacted isocyanate functionality

Urethane B

Into a dry 500 mL three-necked flask fitted with a stirrer, a Dean Stark apparatus, a condenser, a thermometer, and nitrogen inlet and outlet, was placed 104.25 g (0.15 moles) Desmodur Rf (20% solids in $CH_2Cl_2$) followed by 136 g EtOAc. The $CH_2Cl_2$ was removed by Dean Stark distillation. The Dean Stark apparatus was replaced by an addition funnel and 27.9 g (0.05 moles) N-methyl perfluorooctanesulfonamidoethyl alcohol were added followed by 0.03 g DBTDL. The reaction temperature was maintained at 70° C. and 8.7 g (0.1 moles) 2-butanone oxime were added over a period of 10 minutes. The reaction mixture was stirred at reflux (about 75° C.) for 4 hours. The reaction was substantially complete as indicated by infrared spectroscopy which showed substantially no unreacted isocyanate functionality.

Urethane C

Into a dry 500 mL three-necked flask fitted with a stirrer, an addition funnel, a condenser, a thermometer, and nitrogen inlet and outlet, was placed 58.4 g (0.15 moles) Desmodur L (75% in EtOAc) followed by 74 g EtOAc, 27.9 g (0.05 moles) N-methyl perfluorooctanesulfonamidoethyl alcohol (MeFOSE), and 9.4 g (0.1 moles) phenol. The reaction mixture was heated until a temperature of 70° C. was reached. Then 0.04 g DBTDL (dibutyltindilaureate) was added. The reaction mixture was stirred for about 15 hours at reflux (about 75° C.). The reaction was substantially complete as indicated by infrared spectroscopy which showed substantially no unreacted isocyanate functionality.

Comparative Urethanes D, E, F, G, H, I, J and K

Comparative urethanes D, E, F and G were prepared following the general procedure used to prepare Urethane A except aliphatic isocyanates listed below were substituted for the PAPI. Comparative urethanes H, I, J and K were prepared following the general procedure used to prepare Urethane A except aliphatic isocyanates listed below were substituted for the PAPI and phenol was used as the blocking agent.

Urethane D: isophorone diisocyanate
Urethane E: Desmodur TM W
Urethane F: trimethylhexamethylene diisocyanate
Urethane G: Desmodur TM N75
Urethane H: isophorone diisocyanate-1890
Urethane I: Desmodur TM W
Urethane J: trimethylhexamethylene diisocyanate
Urethane K: Desmodur TM N75

Terpolymer A

Into a dry 500 mL three-necked flask fitted with a stirrer, an addition funnel, a condenser, a thermometer, and nitrogen inlet and outlet, were placed 86.4 g (0.14 moles) N-methyl perfluorooctanesulfonamidoethyl acrylate, 8.8 g (0.26 mole) octadecylmethacrylate and 18.8 g (0.008 moles) polydimethylsiloxane methacylate (available from Shin Etsu, Num Ave MW 2000) followed by 266 g EtOAc and 0.57 g n-octylmercaptane (0.5% on weight). After purging the reactor with nitrogen, the temperature of the reaction mixture was raised to about 65° C. and 0.57 g (0.5% on weight) of AIBN (azoisobutylnitrile) was added. The reaction mixture was refluxed at about 65° C. for 16 hours. The reaction was substantially complete as indicated by gas chromatography which showed substantially no unreacted starting materials.

Terpolymers B, C and E

Terpolymers B, C, and D were prepared following the procedure used to prepare Terpolymer A except the molecular weight of the polydimethylsiloxane methacrylate was 2000, 1500 and 4600, respectively.

Terpolymers E, F, G, H, I AND J

Terpolymers E, F, G, H, I, and J were prepared following the general procedures used in preparing Terpolymer A, except the precursor materials were varied and were used in a molar ratio of 80/15/5 for i) the fluorine-containing monomer, ii) the fluorine-free hydrocarbon monomer and iii) the fluorine-free siloxane-containing monomer, respectively. The precursor monomers used are set forth below.

Terpolymer E i) N-methyl perfluorooctanesulfonamidoethyl acrylate
ii) octadecyl methacrylate
iii) polydimethylsiloxane methacrylate (MW 2000)

Terpolymer F i) N-methyl perfluorooctanesulfonamidoethyl acrylate
ii) ethylhexyl methacrylate
iii) polydimethylsiloxane methacrylate (MW 2000)

Terpolymer G i) N-methyl perfluorooctanesulfonamidoethyl acrylate
ii) ethylhexyl acrylate
iii) polydimethylsiloxane methacrylate (MW 2000)

Terpolymer H i) N-methyl perfluorooctanesulfonamidoethyl acrylate
ii) 1,3-dichloropropane acrylate
iii) polydimethylsiloxane methacrylate (MW 2000)

Terpolymer I i) N-methyl perfluorooctanesulfonamidoethyl acrylate
ii) t-butylcyclohexyl methacrylate
iii) polydimethylsiloxane methacrylate (MW 2000)

Terpolymer J i) N-methyl perfluorooctanesulfonamidoethyl methacrylate ii) octadecyl methacrylate
iii) polydimethylsiloxane methacrylate (MW 2000)

Copolymer A

Copolymer A was prepared following the procedure used to prepare Terpolymer A except the PDMS-MA was not added.

Extender A

Into a dry 500 mL three-necked flask fitted with a stirrer, an addition funnel, a condenser, a thermometer, and nitrogen inlet and outlet, were placed 113.6 g (0.57 moles) ethylhexyl methacrylate and 6.4 g (0.06 mol) N-methylol acrylamide followed by 6 g Ethoquad HT/25 and 0.6 g tertdodecylmercaptane and 280 g water. The reaction mixture was degassed twice under vacuum and then 0.48 g V-50 initiator (available from WACKO) was added. The reaction mixture was again degassed and then stirred for about 16 hours at a temperature of about 70° C.

In the following non-limiting examples all ratios, parts and percentages are by weight unless otherwise indicated. In the examples the following test methods were used.

Oil Repellency

Oil repellency was measured using AATCC Test Method 118-1975, "Oil Repellency: Hydrocarbon Resistance Test" as described in *AATCC Technical Manual*, 1977, 53, 223. This test measures the resistance of a substrate to wetting by a series of hydrocarbon liquids with a range of surface tensions. The values reported range from 0 (least repellent) to 8 (most repellent) and are designated in the tables as OR.

Spray Rating

The spray rating, i.e., resistance of a treated substrate to wetting with water, was measured using AATCC Test Method 22-1977, "Water Repellency: Spray Test" as described in *American Association of Textile Chemists and Colorists and Colorists Technical Manual*, 1977, 53, 245. Samples are rated on a scale of 0 to 100, with 0 indicating complete wetting of the upper and lower surfaces of the substrate and with 100 indicating no wetting. A rating after the laundering/wetting and drying cycle of at least 70 indicates acceptable performance. A rating of at least 80+/90 is preferred. These values must preferably be compared within a test sequence because the absolute value will vary with different substrate materials, weave pattern, or fiber sizes. Spray rating values are designated in the tables as SR.

Test results for oil repellency and spray ratings are normally reported as integer values from 0 to 8 or 0 to 100 respectively. Some of the results reported here include a '+' or a '−' following the numerical value representing an intermediate value.

Laundering Procedure

A 230 g sample of generally square, about 400 cm$^2$ to 900 cm$^2$ sheet of treated substrate was placed in a washing machine (Type W 724 available from Miele, Germany) along with a ballast sample (1.9 Kg of 8 oz fabric in the form of generally square, hemmed 8100 cm$^2$ sheets). Omitting the prewash cycle, conventional detergent ("Tide", 46 g) was added and the washer was filled to high water level with hot water (40° C. +/− 3° C.). The substrate and ballast load was washed the indicated number of times using a 20-minute normal wash cycle followed by five rinse cycles and centrifuging. This procedure was used to prepare treated substrate samples designated in the examples as "Laundered". The number of "laundry cycles" indicates the number of times this procedure is repeated. The fabric samples are not dried between repeat cycles.

Severe Wetting Procedure

This test simulates a complete and thorough wetting by following the above described laundering procedure except that no detergent was used and the water temperature was room temperature (about 20° C.).

Tumble Dry Cycle

The substrate and the ballast were dried together in a conventional tumble drier at 70-75° C. at a setting of "normal dry". The machine turns itself off when the environmental humidity drops below a given value. This generally takes 15-25 minutes depending upon the load in the machine. Materials tested after a Tumble Dry Cycle are labeled TD.

Air Dry Procedure

The substrate is hung on a supporting means and exposed to ambient room conditions (about 20° C.) until dry. Materials tested after a Air Dry Procedure are labeled LAD.

Ironing cycle

After drying, samples are given a press using a hand iron with the temperature set for the fiber content of the substrate.

Bundesmann Test

Samples are tested as described in DIN 53 888.

EXAMPLE 1

80 parts of Urethane A and 20 parts of Terpolymer A were blended, the ratios being based on the solids contents of the solutions. The resulting solution was then emulsified by adding the organic solution to an aqueous phase (342 g water) which contains surfactant (11.4 g ETHOQUAD HT/25) and 28.5 g ethylene glycol under ultra-turax treatment at 65° C. This was followed by two passes through a high shear homogenizer. The resulting dispersion was stripped of ethyl acetate at reduced pressure with a water aspirator and a pot temperature of 55° C. to yield an emulsion with 25% total solids. Generally, emulsification can be carried out before the blending of the components or the mixture may be emulsified after the two components are added together.

The emulsion was padded on a blue cotton woven (150 g/m$^2$) fabric and excess liquid was removed by squeeze rollers so that the dried substrate retained about 0.375% by weight of the copolymer/urethane mixture. The treated substrate was dried at about 70° C. and cured for about 3 minutes 150° C.

EXAMPLE 2-7

Examples 2-7 were prepared as in Example 1, except the ratios of the components were varied as indicated in Table 1.

TABLE 1

| Example | Urethane A (parts) | Terpolymer A (parts) |
|---|---|---|
| 2 | 70 | 30 |

TABLE 1-continued

| Example | Urethane A (parts) | Terpolymer A (parts) |
|---|---|---|
| 3 | 60 | 40 |
| 4 | 50 | 50 |
| 5 | 40 | 60 |
| 6 | 30 | 70 |
| 7 | 20 | 80 |

The treated samples of Examples 1-7 were evaluated for oil repellency and spray rating initially and after laundering 5 times at 40° C. and air drying, tumble drying, and ironing after air drying. The results are set forth in Table 2.

TABLE 2

| | Example | | | | | | |
|---|---|---|---|---|---|---|---|
| | 1 | 2 | 3 | 4 | 5 | 6 | 7 |
| Spray rating | | | | | | | |
| Initial | 100 | 100 | 100 | 100 | 100 | 100 | 100 |
| LAD | 50 | 70 | 80 | 70+ | 80 | 50 | 0 |
| TD | 70 | 70+ | 80 | 80+ | 80+ | 80 | 0 |
| Ironing | 70 | 90 | 90 | 90 | 90 | 80 | 70 |
| Oil repellency | | | | | | | |
| Initial | 2 | 3 | 4 | 4 | 4 | 3+ | 3 |
| LAD | 0 | 0 | 0 | 0 | 0 | 0 | 0 |
| TD | 1+ | 1+ | 2 | 2 | 2 | 1+ | 0 |
| Ironing | 2 | 2 | 2+ | 3+ | 3 | 2 | 1+ |

EXAMPLES 8-14

In Examples 8-14, 65/35 polyester/cotton woven (150 g/m$^2$) fabric was treated as in Examples 1-7, respectively and tested for oil repellency and spray rating as in Examples 1-7. The result are set forth in Table 3.

TABLE 3

| | Example | | | | | | |
|---|---|---|---|---|---|---|---|
| | 8 | 9 | 10 | 11 | 12 | 13 | 14 |
| Spray rating | | | | | | | |
| Initial | 100 | 100 | 100 | 100 | 100 | 100 | 80+ |
| LAD | 70 | 70 | 70 | 70 | 70 | 70 | 0 |
| TD | 80 | 80 | 80 | 80+ | 80 | 80 | 50+ |
| Ironing | 90 | 80+ | 80+ | 90 | 80+ | 80 | 70 |
| Oil repellency | | | | | | | |
| Initial | 3+ | 4+ | 4+ | 4 | 4+ | 4+ | 4+ |
| LAD | 0 | 0 | 0 | 0 | 0 | 0 | 0 |
| TD | 1 | 2 | 2 | 1+ | 2 | 1+ | 2 |
| Ironing | 3 | 3 | 3 | 2 | 3 | 3+ | 3 |

EXAMPLES 15-19

Examples 15-24 were prepared by treating the polyester/cotton fabric as used in Examples 8-14 with the composition of Example 4 (50/50 terpolymer/urethane) using the procedure of Example 1 and varying amounts of Extender A as indicated in Table 4. The treating solution was applied such that 0.4% solids were applied to the fabric.

TABLE 4

| Example | Terpolymer A/Urethane A (parts) | Extender A (parts) |
|---|---|---|
| 15 | 100 | 0 |
| 16 | 90 | 10 |
| 17 | 80 | 20 |
| 18 | 70 | 30 |
| 19 | 60 | 40 |

The treated samples were tested for oil repellency and spray rating initially, after laundering 5 times and tumble drying and after laundering and ironing. The results are set forth in Table 5.

TABLE 5

| | Example | | | | |
|---|---|---|---|---|---|
| | 15 | 16 | 17 | 18 | 19 |
| Spray Rating | | | | | |
| Initial | 100 | 100 | 100 | 100 | 100 |
| TD | 85 | 85 | 70 | 85 | 85 |
| Ironing | 90+ | 90+ | 90 | 90 | 90 |
| Oil Repellency | | | | | |
| Initial | 4+ | 5 | 4+ | 4+ | 3 |
| TD | 2 | 2 | 2 | 2 | 1+ |
| Ironing | 3+ | 3+ | 3 | 3 | 2 |

EXAMPLES 20-24

In Examples 20-24, fabrics were treated as in Examples 15-19, respectively, except the treating solution was applied such that 0.3% solids were applied to the fabric. The samples were tested as in Examples 15-19. The results are set forth in Table 6.

TABLE 6

| | Example | | | | |
|---|---|---|---|---|---|
| | 20 | 21 | 22 | 23 | 24 |
| Spray Rating | | | | | |
| Initial | 100 | 100 | 100 | 100 | 100 |
| TD | 80 | 80 | 70+ | 70+ | 70 |
| Ironing | 90 | 80+ | 80 | 80 | 80 |
| Oil Repellency | | | | | |
| Initial | 4 | 3+ | 3 | 2+ | 2 |
| TD | 1+ | 1 | 1 | 1 | 1 |
| Ironing | 1+ | 2 | 2 | 2 | 1 |

The results from Tables 5 and 6 indicate that up to 20% extender may be added without substantial loss of performance.

EXAMPLES 25-27

In Example 25, Urethane A and Terpolymer B were each emulsified using 1% ETHOQUAD ™ HT25 and mixed at a ratio of 1:1 to provide an emulsion containing 25% solids in ethylene glycol and 69% water. In Examples 26 and 27, emulsions were prepared as in Example 25 except Terpolymers C and D, respectively, were used instead of Terpolymer B. The polyester/cotton fabric was treated with these emulsions as in Examples 8-14 to provide 0.375% solids on the fabric. The treated fabrics were tested for oil repellency and spray rating initially and, after five launderings, after air drying, tumble drying, and ironing after tumble drying. The results are set forth in Table 7.

TABLE 7

| | Example | | |
|---|---|---|---|
| | 25 | 26 | 27 |
| Spray Rating | | | |
| Initial | 100 | 100 | 100 |
| LAD | 70+ | 70 | 70 |
| TD | 80 | 80 | 90+ |
| Ironing | 90 | 90 | 90 |
| Bundesmann | | | |
| 1' | 5 | 4 | 5 |
| 5' | 4+ | 2 | 3 |
| 10' | 2 | 1 | 1 |
| % ab | 19 | 15 | 15 |
| PEN | 5 | 4 | 4 |
| Oil Repellency | | | |
| Initial | 5 | 4+ | 4 |
| LAD | 1 | 1 | 1 |
| TD | 2 | 2 | 1 |
| Ironing | 4+ | 4+ | 4+ |

As may be seen from the results in Table 4, the performance is acceptable over the entire range of MW evaluated, however, the combination of performance results favors example 25.

EXAMPLES 28 AND 29 AND COMPARATIVE EXAMPLES C1 and C2

In Examples C1 and C2 treating emulsions were prepared by mixing Copolymer A and Urethane A in a 50/50 mixture as described for Example 1. In Examples 28 and 29, treating emulsions were prepared by mixing Terpolymer A and Urethane A in a 50/50 mixture as described for Example 1. In Examples C1 and 28, polyester/cotton fabrics were treated as in Examples 8-14 to provide 0.375% solids on fabric. In Examples C2 and 29, cotton fabrics were treated as in Examples 1-7 to provide 0.375% solids on fabric. In each of the examples sufficient extender was added to the emulsion to provide 0.75% extender solids on the treated fabric. The treated fabrics were tested for oil repellency and spray rating initially and, after five laaunderings, after air drying and tumble drying. The Bundesmann test was also run on the polyester/cotton samples. The results are set forth in Table 8.

TABLE 8

| | Example | | | |
|---|---|---|---|---|
| | C1 | 28 | C2 | 29 |
| Spray Rating | | | | |
| Initial | 100− | 100 | 100− | 100 |
| LAD | 70+ | 80 | 50 | 70 |
| TD | 90 | 90 | 70+ | 80 |
| Bundesmann | | | | |
| 1' | 5 | 5 | — | — |
| 5' | 3 | 4 | — | — |

TABLE 8-continued

| | Example | | | |
|---|---|---|---|---|
| | C1 | 28 | C2 | 29 |
| 10' | 2−1 | 2 | — | — |
| % ab | 58.3 | 43.5 | — | — |
| PEN | 19.5 | 14.0 | — | — |
| Oil Repellency | | | | |
| Initial | 4 | 4 | 5 | 4 |
| LAD | 0 | 0 | 0 | 0 |
| TD | 2 | 1 | 2 | 1 |

EXAMPLE 30 AND COMPARATIVE EXAMPLES C3 AND C4

In Example 30, a treating solution was prepared by emulsifying and mixing at a 1:1 ratio Urethane A and Terpolymer A and adding to this mixture Extender A in an amount to comprise 20% of the solution. In Comparative Examples C3 and C4, Copolymer A (prepared without PDMS-MA monomer) was substituted for Terpolymer A and, in Comparative Example C3, 2% PDMS-MA homopolymer was added to the treating solution and, in Comparative example C4, 5.4% nonfunctional PDMS (number average molecular weight 2000) was added to the treating solution.

Polyester/cotton fabric samples, as used in Examples 8-14 were treated as in Example 1 to provide 0.375% total solids on the fabric. Oil repellency and spray rating were determined initially and after tumble drying. The results are set forth in Table 9.

TABLE 9

| | Example | | |
|---|---|---|---|
| | 30 | C3 | C4 |
| Spray Rating | | | |
| Initial | 100+ | 100 | 100 |
| TD | 90 | 80 | 90 |
| Oil Repellency | | | |
| Initial | 4+ | 1+ | 3 |
| TD | 2 | 0 | 1 |

The PDMS segment is most beneficial when it is reacted into the terpolymer component.

EXAMPLE 31 AND COMPARATIVE EXAMPLES C5 AND C6

In Example 31, a treating solution was prepared using Urethane A and Terpolymer A at a 1:1 ratio. In Comparative Example C5, the treating solution contained only Urethane A. In Comparative Example C6, the treating solution contained only Terpolymer A. The treating solutions were applied to polyester fabric as in Examples 8-14 to provide 0.5% solids on the fabric. The fabric samples were tested for oil repellency and spray rating initially and after tumble drying subsequent to five launderings. The results are set forth in Table 10.

TABLE 10

| | Example | | |
|---|---|---|---|
| | 31 | C5 | C6 |
| Spray Rating | | | |
| Initial | 100 | 100 | 70 |
| TD | 90 | 70 | 50 |
| Oil Repellency | | | |
| Initial | 5 | 4 | 4 |
| TD | 4 | 3 | 0 |

EXAMPLE 32 AND COMPARATIVE EXAMPLES C7 AND C8

Examples 32, C7 and C8 were prepared and tested the same as Examples 31, C5 and C6, respectively, except the fabric treated was the cotton fabric used in Example 1. The test results are set forth in Table 11.

TABLE 11

|  | Example | | |
|---|---|---|---|
|  | 32 | C7 | C8 |
| Spray Rating |  |  |  |
| Initial | 100 | 50 | 0 |
| TD | 80 | 0 | 0 |
| Oil Repellency |  |  |  |
| Initial | 5 | 3 | 2 |
| TD | 5 | 0 | 0 |

The results in Tables 10 and 11 show the substantial retention of performance of the blended components when compared to the components individually.

EXAMPLES 33 AND 34

In Examples 33 and 34, Urethane A and Terpolymer B were each emulsified using 1% ETHOQUAD ™ HT25 and mixed at a ratio of 1:1 to provide an emulsion containing 25% solids in ethylene glycol and 69% water. Polyester/cotton fabric was then treated with the solution to provide 0.375% solids on the fabric. The fabric of Example 33 was subjected to five cycles of the severe wetting procedure. The fabric of Example 34 was subjected to five cycles of the laundering procedure. The samples were tested for oil repellency and spray rating initially and after air drying, tumble drying and ironing after tumble drying. The results are set forth in Table 12.

TABLE 12

|  | Example | |
|---|---|---|
|  | 33 | 34 |
| Spray rating |  |  |
| Initial | 100 | 100 |
| Severe Wetting/Air Dry | 100− |  |
| Laundering/Air Dry |  | 70 |
| Severe Wetting/Tumble Dry | 100 |  |
| Laundering/Tumble Dry |  | 80+ |
| Severe Wetting/Ironing | 100 |  |
| Laundering/Ironing |  | 90 |
| Oil repellency |  |  |
| Initial | 5 | 5 |
| Severe Wetting/Air Dry | 4+ |  |
| Laundering/Air Dry |  | 0 |
| Severe Wetting/Tumble Dry | 5 |  |
| Laundering/Tumble Dry |  | 2+ |
| Severe Wetting/Ironing | 5 |  |
| Laundering/Ironing |  | 4 |

This demonstrates the ability of the treated substrate to recover its repellency performance after several severe wettings such as may be experienced during actual use.

EXAMPLES 35-40

In Examples 35-40, treating emulsions were prepared as in Example 1 using Urethane A and the terpolymer set forth in Table 13 at a ratio of 1:1. The emulsion also contained Extender A. Polyester/cotton fabric was treated as in Example 1 to provide 0.3% of the urethane/terpolymer and 0.075% extender. The fabrics were tested for oil repellency and spray rating initially, after tumble drying and after ironing. The results are set forth in Table 13.

TABLE 13

|  | Example | | | | | |
|---|---|---|---|---|---|---|
|  | 35 | 36 | 37 | 38 | 39 | 40 |
| Terpolymer | E | F | G | H | I | J |
| Spray rating |  |  |  |  |  |  |
| Initial | 100 | 100 | 100 | 100 | 100 | 100 |
| TD | 90 | 70 | 80 | 70 | 50 | 70+ |
| Ironing | 90 | 80 | 90 | 80 | 70 | 90 |
| Oil repellency |  |  |  |  |  |  |
| Initial | 4 | 3 | 4 | 3 | 3 | 2 |
| TD | 2 | 2 | 3 | 2 | 2 | 0 |
| Ironing | 4 | 3 | 4 | 2 | 2 | 1 |

As shown by the above data, the preferred composition is 35.

COMPARATIVE EXAMPLES C9 TO C16

In Examples C9 to C16, treating emulsions were prepared as in Example 1 using a 1:1 ratio of the comparative urethane set forth below in Table 14 and Terpolymer A. Polyester/cotton fabrics were treated as in Example 1 to provide 0.375% solids on fabric. The fabrics were tested for oil repellency and spray rating initially, and after tumble drying and ironing. The results are set forth in Table 14.

TABLE 14

|  | Example | | | | | | | |
|---|---|---|---|---|---|---|---|---|
|  | C9 | C10 | C11 | C12 | C13 | C14 | C15 | C16 |
| Urethane | D | E | F | G | H | I | J | K |
| Spray rating |  |  |  |  |  |  |  |  |
| Initial | 80W | 80 | 70 | 70W | 70W | 70W | 70W | 80 |
| TD | 0 | 0 | 0 | 0 | 0 | 0 | 0 | 0 |
| Ironing | 70+ | 0 | 0 | 0 | 0 | 0 | 0 | 50 |
| Oil repellency |  |  |  |  |  |  |  |  |
| Initial | 2 | 8 | 5 | 3 | 2 | 5+ | 6 | 4 |
| TD | 0 | 0 | 0 | 0 | 0 | 0 | 0 | 0 |
| Ironing | 1 | 2 | 2 | 1 | 0 | 1 | 0 | 1+ |

EXAMPLE 41 AND COMPARATIVE EXAMPLES C17 AND C18

The results in Table 15 show the comparison of an example of the invention and AG 460 (44 weight percent octadecyl acrylate, 53.3 weight percent fluorochemical acrylate and 2.7 weight percent isooctyl phenol-6-ethyleneoxyethanol) available from Asahi Glass Co. Example 41 is a 50/50 mixture of Urethane 1 and Copolymer 4 with 20% Extender 5 applied at a rate of 0.375 percent solids based on the weight of the fabric. Examples C17 and C18 are AG 460 applied at rates of 0.3 percent and 1.0 percent solids based on the weight of the fabric. All three examples have good initial performance, but the AG460 fails to maintain its performance through the laundering and drying cycles.

TABLE 15

|  | Example | | |
|---|---|---|---|
|  | 41 | C17 | C18 |
| Spray Rating |  |  |  |
| Initial | 100 | 100− | 100− |
| TD | 95 | 0 | 0+ |
| Ironing | 95 | 50 | 50 |
| Oil Repellency |  |  |  |
| Initial | 3+ | 3+ | 6 |
| TD | 1+ | 0 | 0 |

We claim:

1. A composition for treating fibrous substrates to provide oil and water repellency the composition comprising an aqueous emulsion of a) a terpolymer comprising randomly distributed i) units containing a fluoroaliphatic group, $R_f$; ii) fluorine-free organic units derived from ethylenic compounds capable of free-radical polymerization, and iii) units containing silicone and b) a fluorine-containing compounds derived from fluoroaliphatic radical-containing monoalcohols, di- or polyisocyanates and isocyanate blocking agents.

2. The composition of claim 1, wherein the ratio of component (a) to component (b) is from 20:80 to 70:30.

3. The composition of claim 2, wherein the ratio of component (a) to component (b) is from 40:60 to 60:40.

4. The composition of claim 1 wherein the terpolymer comprises about 50 to 90 weight percent of the copolymerizable segments containing an $R_f$ group, about 10 to 50 weight percent of the copolymerizable organic segments free of fluorine and about 3 to 25 weight percent of the copolymerizable segments containing silicone when the silicone segment has a number average molecular weight in the range of about 1000 to 10,000 or about 0.5 to 10 weight percent when the silicone segment has a number average molecular weight in the range of about 10,000 to 20,000.

5. The composition of claim 1 wherein said terpolymer can be represented by the general formula I

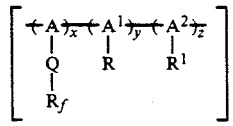

wherein

A, $A^1$, and $A^2$ are randomly distributed and are each independently an alkylene group having 2 to 3 carbon atoms capable of copolymerization;

Q represents a divalent organic linking group;

$R_f$ represents a fluoroaliphatic group which comprises a fully fluorinated terminal group;

R represents a fluorine free organic group;

$R^1$ represents a fluorine free organic group which comprises a siloxanyl group;

x is about 5 to 100;

y is about 5 to 200; and z is about 1 to 75.

6. The composition of claim 1 wherein said terpolymer is formed by the polymerization of monomers represented by the formulas $$A'-Q-R_f \qquad \text{II}$$

$$A^{1'}-R \qquad \text{III}$$

$$A^{2'}-R^1 \qquad \text{IV}$$

wherein

A', $A^{1'}$, and $A^{2'}$ represent ethylenically unsaturated alkyl segments having 2 to 3 carbon atoms capable of copolymerization;

Q represents a divalent organic linking group;

$R_f$ represents a fluoroaliphatic group which comprises a fully fluorinated terminal group;

R represents a fluorine free organic group; and $R^1$ represents a fluorine free organic group which comprises a siloxanyl group.

7. The composition of claim 1 wherein component (b) can be represented by the formula $$(R_f-Q-R^2)_{\overline{n}}X(Y)_m$$

wherein $R_f$ represents a fluoroaliphatic group which comprises a fully fluorinated terminal portion; Q represents a divalent organic linking group; $R^2$ represents a fluorine free aliphatic radical which is the residue of a moiety capable of reacting with an isocyanate; X represents a polyvalent isocyanate residue; Y represents an organic moiety capable of blocking an isocyanato group; and m+n equals the number of isocyanato functionalities contained in the isocyanate compound which is the precursor of X.

8. The composition of cliam 1 further comprising a hydrocarbon extender.

* * * * *

UNITED STATES PATENT AND TRADEMARK OFFICE
CERTIFICATE OF CORRECTION

PATENT NO. : 5,258,458  
DATED : November 2, 1993  
INVENTOR(S) : Kathy Allewaert, Inge Bohez and Pierre Vander Elst Page 1 of 2

It is certified that error appears in the above-indentified patent and that said Letters Patent is hereby corrected as shown below:

ON THE TITLE PAGE:

| | |
|---|---|
| [75] Inventors: | "Pierre V. Elst" should read -- Pierre Vander Elst -- |
| Col. 1, line 50 | "$R_fCH_2CH_2OCOC(R)-CH^2$" should read -- $R_fCH_2CH_2OCOC(R)=CH_2$ -- |
| Col. 5, line 18 | "ehtylenically" should read -- ethylenically -- |
| Col. 6, line 8 | "R," should read -- $R_f$ -- |
| Col. 6, line 14 | "group 0 links" should read -- group Q links -- |
| Col. 8, line 53 | "is" (first instance) should read -- in -- |
| Col. 12, line 25 | "Terpolymers B, C and E" should read -- Terpolymers B, C and D -- |
| Col. 17, line 6 | "in ethylene" should read -- in 6% ethylene -- |
| Col. 19, line 27 | "in ethylene" should read -- in 6% ethylene -- |
| Col. 21, line 9 | insert a "," after "repellency" |

UNITED STATES PATENT AND TRADEMARK OFFICE
CERTIFICATE OF CORRECTION

PATENT NO. : 5,258,458
DATED : November 2, 1993
INVENTOR(S) : Kathy Allewaert, Inge Bohez and Pierre Vanger Elst It is certified that error appears in the above-indentified patent and that said Letters Patent is hereby corrected as shown below:

Col. 21, line 14    delete "a" at end of line.

Signed and Sealed this

Twenty-eighth Day of June, 1994

Attest:

BRUCE LEHMAN

Attesting Officer    Commissioner of Patents and Trademarks